United States Patent [19]

March et al.

[11] Patent Number: 5,953,227

[45] Date of Patent: *Sep. 14, 1999

[54] METHOD AND APPARATUS FOR MONITORING HYDROELECTRIC FACILITY PERFORMANCE COSTS

[75] Inventors: Patrick March, Maryville; Frank Adkins, Hixson; R. Keith Jones, Knoxville; Paul J. Wolff, Norris, all of Tenn.

[73] Assignee: Tennessee Valley Authority, Muscle Shoals, Ala.

[ * ] Notice: This patent issued on a continued prosecution application filed under 37 CFR 1.53(d), and is subject to the twenty year patent term provisions of 35 U.S.C. 154(a)(2).

[21] Appl. No.: 08/700,314

[22] Filed: Aug. 19, 1996

[51] Int. Cl.$^6$ .................................................. G05B 13/02
[52] U.S. Cl. .......................... 364/156; 364/150; 364/151; 364/148.06; 364/148.07
[58] Field of Search ..................................... 364/148–152, 364/153–158, 159, 164, 165, 492–495, 148.04, 148.06, 148.07

[56] References Cited

U.S. PATENT DOCUMENTS

| | | | |
|---|---|---|---|
| 3,932,735 | 1/1976 | Giras | 235/151.21 |
| 4,075,699 | 2/1978 | Schneider et al. | 364/492 |
| 4,328,556 | 5/1982 | Abe et al. | 364/492 |
| 4,788,647 | 11/1988 | McManus et al. | 364/492 |
| 5,347,446 | 9/1994 | Iino et al. | 364/149 |

*Primary Examiner*—Reba I. Elmore
*Assistant Examiner*—Ramesh Patel
*Attorney, Agent, or Firm*—Foley & Lardner

[57] ABSTRACT

A method and system are provided for monitoring performance parameters of a hydroelectric power generation facility and determining economic impact of operating the facility at levels other than predetermined reference levels. Optimal or desired levels of parameters of interest are stored in a memory circuit coupled to a central processing circuit. Actual values for the parameters of interest are sensed and communicated to the central processing circuit. Various monitoring circuit modules may be created for specific parameters of interest. The monitoring circuit modules compare the reference values to corresponding actual values and determine deviations from the desired parameter levels. A costing circuit applies an economic impact factor to the deviation values to determine the economic impact of the deviation. The technique may be used to evaluate past or present performance, predict future performance, schedule maintenance, predict payback for plant improvements and the like.

20 Claims, 3 Drawing Sheets

METHOD AND APPARATUS FOR MONITORING HYDROELECTRIC FACILITY PERFORMANCE COSTS

BACKGROUND OF THE INVENTION

The present invention relates generally to monitoring and control of the operation of a hydroelectric power generation facility. In particular, the invention relates to a technique for continuous evaluation of the performance of a turbine power generating installation by monitoring certain operating parameters, comparing the parameters to reference levels, such as optimal or desired levels for the same parameters, and calculating or translating the comparisons into economic cost estimates for use by operations, engineering and management personnel in evaluating past performance, the feasibility of plant improvements and the like.

Various control and monitoring systems have been proposed and are currently available for regulating operation of hydroelectric power production facilities. Such systems are typically dedicated to a particular facet of plant operation, or may more broadly group a number of control systems into a centralized control scheme. It is also known in the art of hydroelectric plant management to determine certain optimal or desired levels of operation, such as gate and blade positions of a Kaplan-type turbine, that are believed to be the best attainable levels given the plant technology, environmental constraints and so forth. However, it is also common that a particular facility may not be capable of continuously maintaining the desired levels of key operating parameters. For example, equipment and maintenance requirements, weather conditions, upstream and downstream water management schemes and many other constraints may restrict operation to other than the desired levels. Moreover, less than optimal conditions may be permitted to exist and continue due to a failure to appreciate the actual or opportunity costs of such operation.

While operations, engineering and management personnel may generally be aware in such situations that the facility is being operated at less than optimal levels, heretofore known control systems have not provided sufficiently informative feedback relating to the actual cost of such operation. In particular, known hydroelectric plant control systems do not quantify inefficient operation in economic terms that are readily meaningful for operations, engineering and management personnel. Consequently, correction of such inefficient operation may be delayed unnecessarily, causing the facility to incur unnecessary real or opportunity costs.

There is a need, therefore, for an improved system for monitoring and evaluating operation of a hydroelectric power generation facility that provides a realistic and continuous estimate of costs associated with operation of the facility at less than optimal or desired conditions. In particular, there is a need for a cost evaluation system that is capable of comparing current operating conditions to predetermined or identified optimal conditions and informing operations, engineering and management personnel of the costs of continued operation at current conditions. Further, there is a need for a monitoring system capable of isolating the cost influence of various operating parameters independently and of tracking performance and accumulated costs associated with the various parameters, thereby allowing plant management to address particular facets of operation independently.

SUMMARY OF THE INVENTION

The present invention, featuring a novel technique for continuously monitoring operation of a hydroelectric power generating facility, is designed to respond to these needs. The technique may be adapted to new facilities or may be retrofitted to existing plants without the need for downtime or additional instrumentation. In general, the technique determines the degree of deviation from desired or reference levels for key operating parameters of interest and derives cost or, more generally, economic impact values for such operation based upon the value of energy produced by the facility. The system may be applied to a wide range of independent or interdependent operating parameters, or may be implemented for a single operating parameter as desired.

Thus, the invention features a method for monitoring performance of a hydroelectric power generation facility. In accordance with the method, a predetermined reference signal for an operating parameter of the power generation facility is stored in a memory circuit, the predetermined reference signal representing a desired operating level for the parameter. A current level of the operating parameter is sensed and a sensed parameter signal is generated representative of the current level. The sensed parameter signal is compared to the predetermined reference signal for the parameter to determine a parameter difference signal, and an economic cost factor is applied to the parameter difference signal to generate an economic cost estimate value. The economic cost estimate value represents the economic cost of operation of the facility at the current level of the operating parameter compared to the desired operating level.

In accordance with another aspect of the invention, the method includes the steps of storing in a memory circuit a reference value for an operating parameter of the facility, the reference value representing a reference operating level for the parameter, and monitoring operation of the facility and generating an actual value for the operating parameter. The reference value is compared to the actual value to determine a difference value. An economic impact value is derived from the difference value by applying an economic impact factor (which may be derived from an economic model) thereto and the economic impact value is stored in the memory circuit.

The invention also provides a system for determining economic impact of operation of a hydroelectric power generation facility at an operating level other than a predetermined reference operating level. The system is designed for application in a facility including a dam extending across a stream and at least one turbine generator supported within the dam for generating electrical power from water flow from an upstream side to a downstream side of the dam. The system includes a memory circuit, a sensor and a controller. The memory circuit stores a reference parameter value representative of the reference operating level for the parameter. The sensor is situated in the facility to detect actual levels of the operating parameter and to generate an actual parameter value representative thereof. The controller is coupled to the memory circuit and to the sensor. The controller compares the reference parameter value and the actual parameter value and applies an economic impact factor thereto to generate an economic impact value representative of the economic impact of operation of the facility at the actual level of the parameter rather than the reference level. Where appropriate, the system may include a plurality of sensing devices, such as transducers, coupled to the controller and the controller may derive the actual parameter value from signals produced by the sensing devices.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
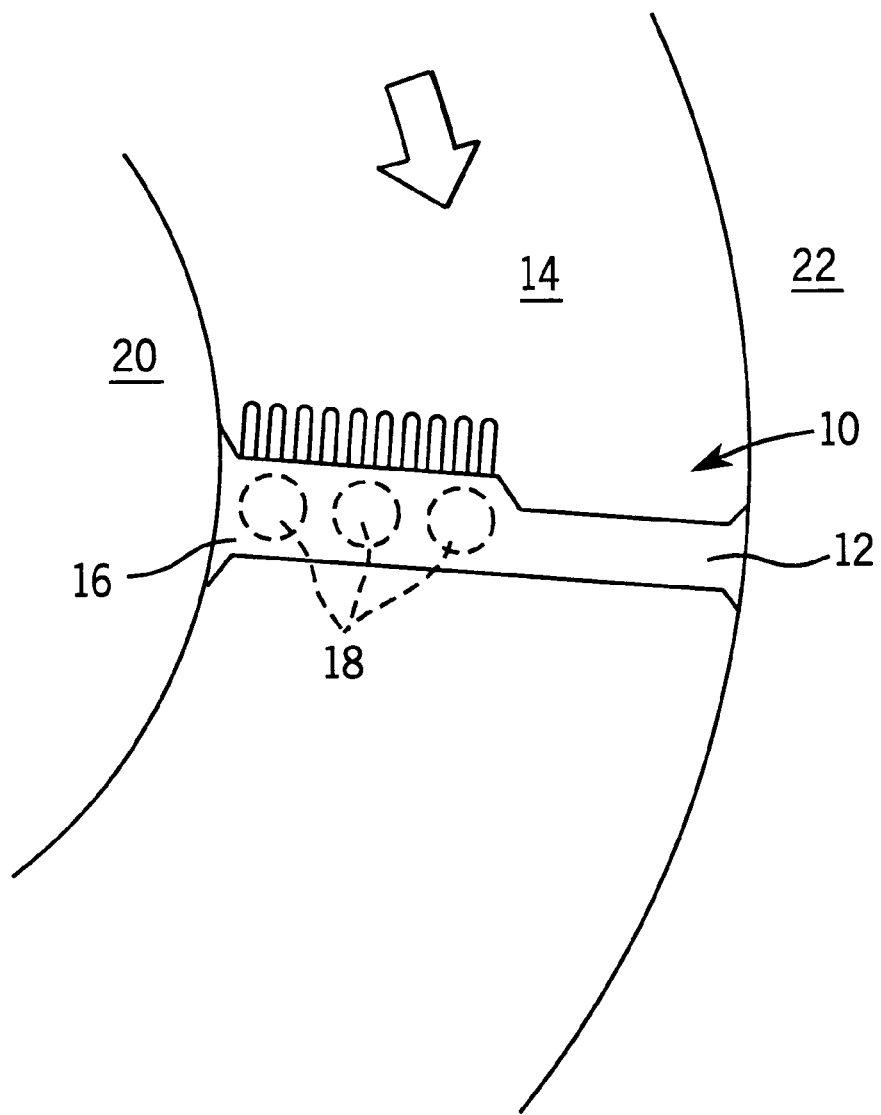
FIG. 1 is an exemplary perspective view of a turbine power generating facility including several turbine units across a section of a stream.

Turning now to the drawings and referring to FIG. 1, a hydroelectric power generating installation 10 is illustrated generally, including a dam 12 spanning a stream 14, and a power generating facility 16. In the exemplary installation illustrated, facility 16 includes a series of three Kaplan turbine generating units, designated generally by the reference numeral 18. As will be understood by those skilled in the art, facility 16 may include more or fewer generating units 18, and such units may be situated adjacent to one or both banks 20, 22 of stream 14, or at various locations between the banks. Moreover, while the following discussion makes reference to a Kaplan turbine by way of example, the present invention is not limited to application with any particular type of turbine unit. In operation, facility 16 generates electrical power by permitting water to flow through turbine units 18, and outputs the generated power on a power distribution grid (not represented).

Figure 2:
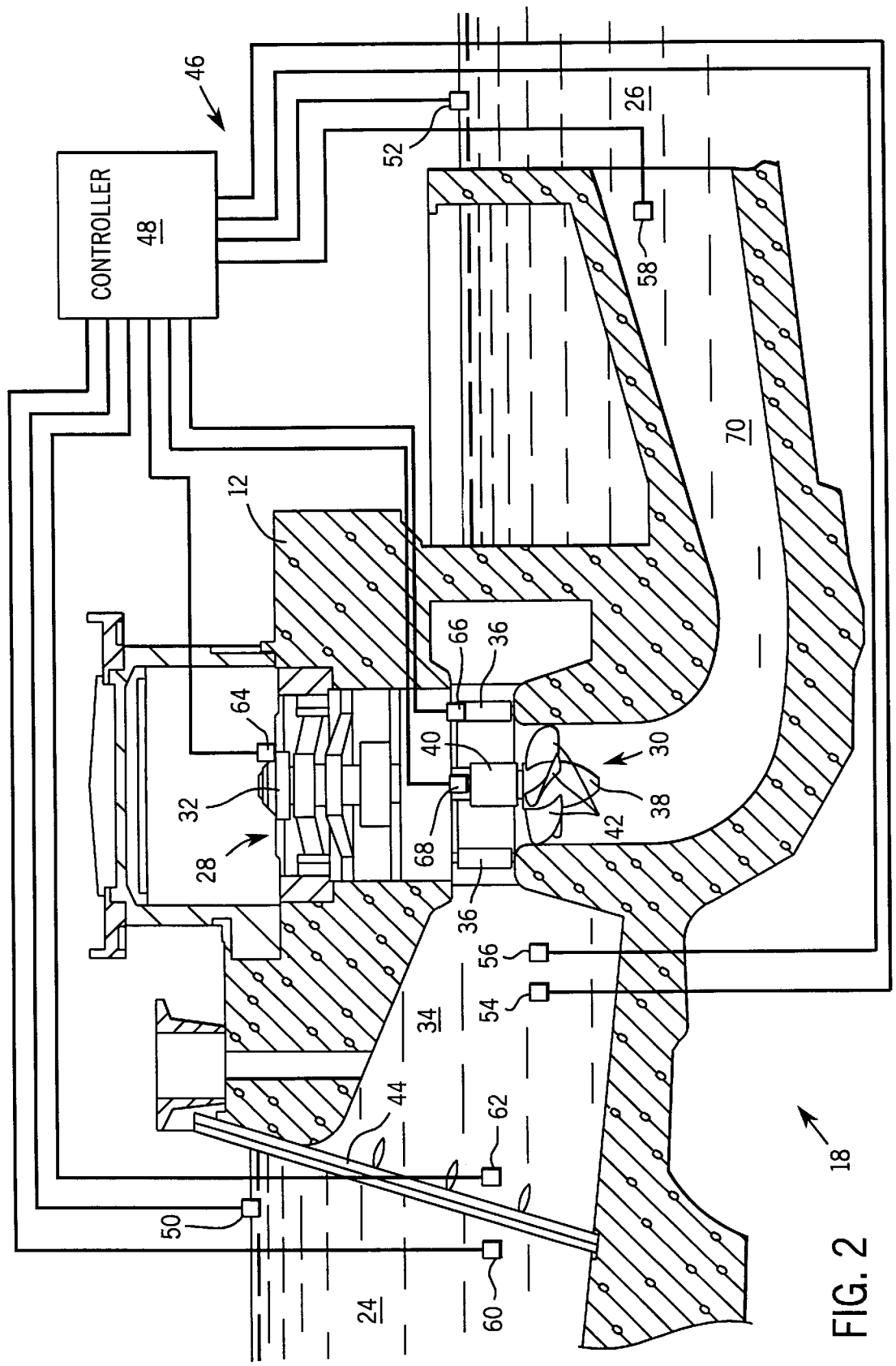
FIG. 2 is a diagrammatical representation of a turbine installation illustrating exemplary instrumentation for monitoring and controlling operating parameters of the facility of FIG. 1 and for determining costs associated with operation of the facility at other than optimal or desired conditions.

Each turbine unit 18 may be of generally known design, such as the vertical Kaplan turbine as illustrated diagrammatically in FIG. 2, for generating electrical power as water is allowed to flow through dam 12 from a headwater reservoir 24 of stream 14 to a tailwater side 26. Thus, unit 18 includes a turbine support superstructure 28 built within dam 12. Superstructure 28 provides axial and radial support for a turbine 30 and electrical generator 32. For the illustrated power generating unit, turbine 30 is positioned within the flow path of stream 14, downstream of an inlet conduit 34 and movable wicket gates 36. Turbine 30 includes a runner 38 supported on a vertical shaft 40 and having a plurality of movable blades 42 disposed around its periphery for driving shaft 40 and generator 32 in rotation as water flows through dam 12 from headwater 24 to tailwater 26. Unit 18 also includes a trash rack 44 upstream of inlet conduit 34, typically comprising parallel, spaced-apart bars, for preventing large objects and debris from fouling or damaging turbine 30. A mechanical cleaning system may be provided atop superstructure 28 for removing debris accumulated upstream of trash rack 44. Alternatively, facility 16 may employ manual methods (e.g. rakes) for removing debris from trash rack 44 when required.

In the preferred embodiment illustrated in FIG. 2, unit 18 includes a control system, designated generally by the reference numeral 46, including a number of sensors 50, 52, 54, 56, 58, 60, 62 and 64 and actuators 66 and 68 coupled to a controller 48 by appropriate data links. For the purpose of controlling operation of unit 18 and monitoring economic impact of operating facility 16 at levels other than predetermined reference levels, the sensors of control system 46 preferably permit detection of a set of operating parameters, including differential head from headwater 24 to tailwater 26, power generation level, flow through unit 18, cavitation, and trash rack head loss. While a number of alternative method are known in the art for directly or indirectly measuring these parameters, preferred sensing devices include the following. Stilling well-type transducers 50 and 52 measure the relative elevation or height of headwater and tailwater 24 and 26, respectively. Such measurements are used to determine the drop in head across dam 12 and for determining the submersion factor ($\sigma$) of the turbine as an indication of the risk of cavitation within turbine 30. The submersion level is generally determined as a function of the difference between the tailwater elevation and a reference elevation for turbine 30 in a manner well known in the art. Sensor 54, positioned, where feasible within inlet conduit 34, is a pressure transducer providing a signal proportional to head upstream of turbine 30, accounting for head losses between headwater 24 and gates 36. Where unit 18 has a relatively short inlet conduit 34, sensor 54 may be situated near its entry. Reference numeral 56 represents a sensor assembly positioned within inlet conduit 34 for generating a signal indicative of flow (including density corrections) through unit 18. In the preferred embodiment, flow is determined by the well known Winter-Kennedy method, although alternative methods could be substituted, including the Peck method. Sensor 58, provided in the draft tube 70 of unit 18, is a pressure transducer similar to sensor 54 generating a pressure measurement signal and isolating losses from turbine 30 to tailwater 26. Sensors 60 and 62 are pressure transducers generating pressure measurements on either side of trash rack 44, and providing an indication of head loss across trash rack 44. Alternatively, trash rack losses could be indicated by measurements of headwater level (e.g. from sensor 50) and inlet head (e.g. from sensor 54). Finally, reference numeral 64 represents a power monitor providing a continuous signal indicative of the level of power being generated by unit 18.

In addition to the sensors described above, control system 46 is typically provided with actuators for regulating physical characteristics of unit 18. By way of example, in the illustrated embodiment, Kaplan turbine actuator assemblies 66 and 68 are provided for orienting gates 36 and blades 42 at desired positions. Actuator assemblies 66 and 68 may be of any suitable type known in the art, such as assemblies including hydraulic cylinders or motors coupled to mechanical linkages for effectuating the desired movement of the gates and blades and for holding the gates and blades in the desired positions against the force of impinging flow through unit 18. Moreover, actuator assemblies 66 and 68 also include sensors, such as potentiometers, linear variable differential transformers or the like, for providing feedback signals indicative of the actual positions of gates 36 and blades 42.

Signals from the various sensors outlined above are applied to controller 48, which also serves to generate control signals for commanding actuator assemblies 66 and 68 to position gates 36 and blades 42 in desired orientations. More generally, controller 48 processes sensed parameter signals from the various sensors and controls various actuators to maintain operating levels in the facility in a manner generally known in the art. In the presently preferred embodiment, controller 48 includes an appropriately configured programmable logic controller executing a cyclic control routine stored in resident memory. Moreover, controller 48 is preferably also linked to other turbine units 18 within facility 16. Thus, where the other units 18 within facility 16 are comparably instrumented, controller 48 receives signals indicative of the operating parameters of all units 18 in facility 16, and controls operation of actuators for all such units.

In the presently preferred embodiment, controller 48 stores reference levels for certain key operating parameters of interest and compares these reference levels to current, actual levels for the respective parameters to determine deviations from the reference levels as described more fully below. In general, such reference levels will include parameters such as power generation efficiency for the current head and flow rate levels, cavitation levels, trash rack losses and the like. The particular parameters monitored by controller 48 may vary from facility to facility in accordance with the needs of operations, engineering and management personnel. However, the monitored parameters are preferably limited to those having an economic impact on operation of the facility. Moreover, it should be understood that the reference levels referred to herein may be established by a variety of methods known in the art. For example, a number of methods are known for establishing optimal gate and blade settings for a Kaplan-type turbine, such as the method disclosed in U.S. Pat. No. 5,402,332, issued to Kopf on Mar. 28, 1995 and hereby incorporated into the present disclosure by reference. Similarly, it is generally known in the art to establish optimal or desired levels of cavitation, typically sensed by acoustic devices positioned within the flow conduit from the turbine, that least adversely impact power production. By way of example, the following discussion presents the present technique as applied to analysis of trash rack losses. As will be appreciated by those skilled in the art, however, techniques for analysis of the economic impact of trash rack losses discussed below are equally applicable to analysis of other relevant operating parameters capable of influencing economic productivity of the hydroelectric facility.

For the particular purpose of monitoring losses across trash rack 44, facility 16 is preferably instrumented as follows. When the structure of facility 16 permits, it is preferred to measure differential head across trash rack 44 via sensors 60 and 62 located as closely adjacent to trash rack 44 as possible to isolate the effects of other (i.e. non-trash rack) losses. In some facilities, however, it may be acceptable or necessary to base estimates of trash rack losses on headwater level (as measured by sensor 50) and on an output of a suitable piezometer positioned within inlet conduit 34. Ultimately, however, when the present technique and system are retrofitted to existing facilities, the particular instrumentation options may be limited by the facility design. In general however, trash rack monitoring as described below requires some form of instrumentation for detecting pressure drop across trash rack 44 and flow through inlet conduit 34.

Figure 3:
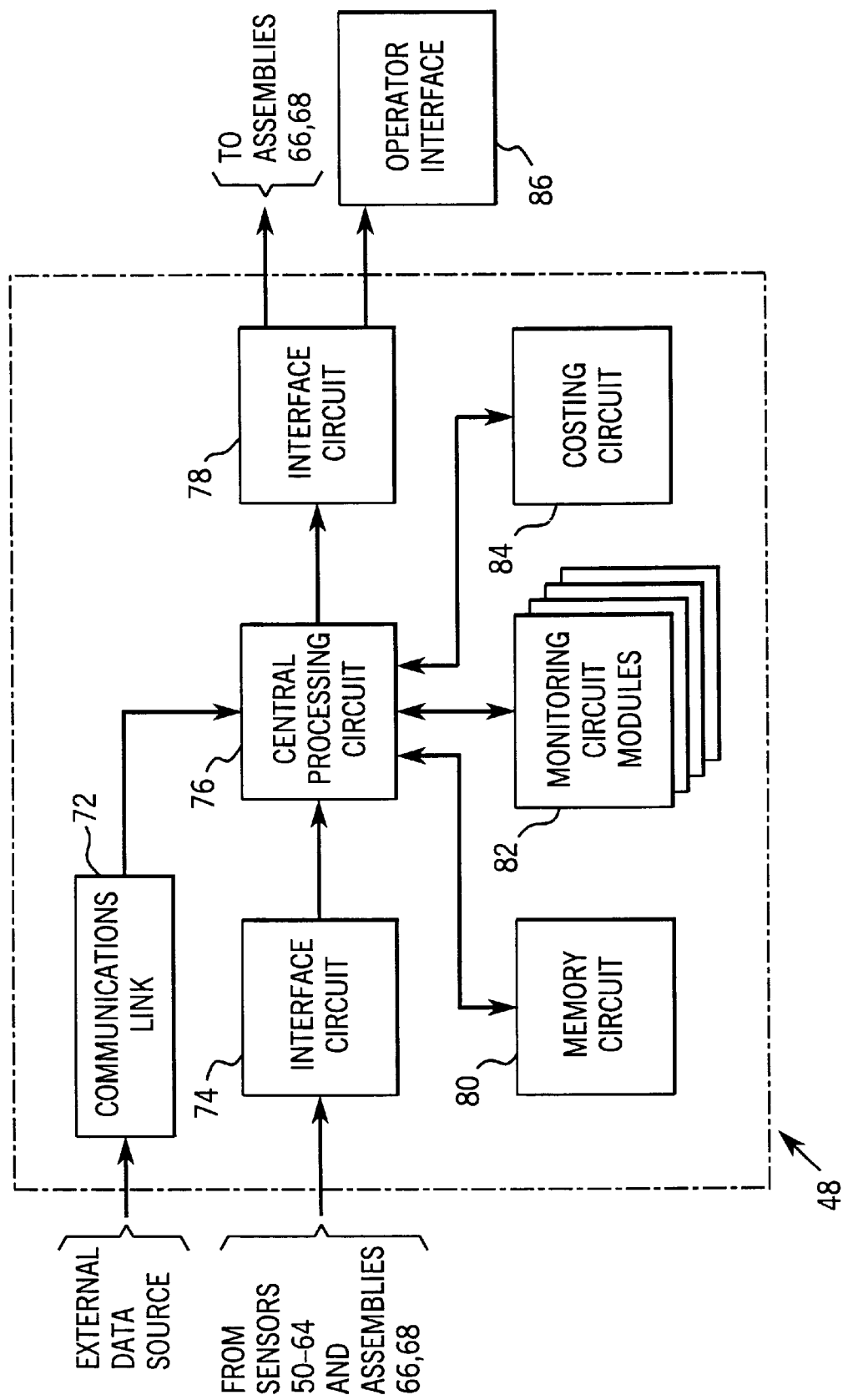
FIG. 3 is a block diagram of certain of the functional circuits in the control system illustrated in FIG. 2 for monitoring the facility operating parameters and determining cost estimates.

FIG. 3 is a general block diagram of certain functional circuits included in controller 48 when programmed to execute an economic impact analysis technique as described below. Controller 48 includes a communications link 72, preferably including a fiber optic-based wide area network, or alternatively, a high speed modem or other telecommunications device, an interface circuit 74, a central processing circuit 76, an interface circuit 78, a memory circuit 80 and a plurality of monitoring circuit modules 82 and a costing circuit 84. Communications link 72 provides central processing circuit 76 with data from an external data source, such as an on-line source of current energy prices for use in economic impact calculations described below. Interface circuit 74, which typically includes appropriate multiplexing, analog-to-digital converting and signal conditioning circuitry receives operating parameter signals from sensors 50–64 and feedback signals from actuator assemblies 66 and 68, and applies these signals to central processing circuit 76. Similarly, interface circuit 78, which typically includes appropriate signal conditioning circuitry, receives control signals from central processing circuit 76 and commands corresponding servo movement of actuators within facility 16, such as actuator assemblies 66 and 68 for controlling orientation of gates 36 and blades 42. Moreover, interface circuit 78 communicates control signals from central processing circuit 76 to an operator interface 86 for displaying operating conditions, such as the head loss across trash rack 44 or cost values associated with current trash rack losses or other operating parameters. Operator interface 86, which will typically include a computer monitor situated in a control station (not shown) for facility 16 may also display or sound visual or audible alarms, such as when trash rack losses exceed predetermined threshold levels as described below.

Central processing circuit 76 is also linked to memory circuit 80, monitoring circuit modules 82 and costing circuit 84. Depending upon the particular need of facility 16, monitoring circuit modules 82 may include a trash rack monitoring circuit module as described below, an efficiency module, a cavitation module, or any other similar routine for monitoring and evaluating operating parameters capable of affecting economic performance of facility 16. In operation, central processing circuit 76 executes a cyclical control routine stored within memory circuit 80 for controlling operation of facility 16. Monitoring circuit modules 82 analyze parameter values accessed in the control routine to determine variations from reference values stored in memory circuit 80. Based upon the monitored values, costing circuit 84 executes calculations of the economic impact of operation of facility 16 at the monitored conditions.

As will be appreciated by those skilled in the art, the functional circuitry represented in FIG. 3 may be defined by standard input/output circuitry, memory circuitry and programming code in a standard programmable logic controller, personal computer, computer workstation or the like. For example, in the presently preferred embodiment, central processing circuit 76, in the form of a programmable logic controller dedicated to facility 16, is provided with resident memory for executing a main control routine. Monitoring circuit modules 82 and costing circuit 84 are preferably portions of the main control routine, or may comprise separate software modules retrofitted to the main control routine.

Application of the present technique to analysis of the economic impact of trash rack losses will now be described. In accordance with a preferred embodiment, controller 48 calculates losses across trash rack 44 as follows. When sensors 60 and 62 are available in facility 16 for detecting parameters representative of the pressure differential across trash rack 44, trash rack monitoring circuit 80 calculates a trash rack head loss parameter or coefficient in accordance with the relationship:

$$K_T = 2\ g(A_T)^2(H_1-H_2)/Q^2 \qquad (1);$$

where $K_T$ is the trash rack loss parameter, g is a gravitational constant, $A_T$ is an intake flow area for the trash rack, $H_1$ is the head immediately upstream from the trash rack, $H_2$ is the head immediately downstream from the trash rack and Q is intake volumetric flow rate. Referring to the diagrammatical view of FIG. 2, the intake flow area utilized in equation 1 will be known for facility 16 and generally corresponds to the cross sectional area of the inlet conduit at the location of sensor 62. As mentioned above, the flow rate through the inlet conduit may be calculated in a variety of known ways, such as the Winter-Kennedy method.

When facility 16 includes net head taps or other suitable piezometer instrumentation in inlet conduit 34 downstream of trash rack 44, the trash rack head loss coefficient may be calculated using the headwater elevation as detected by sensor 50, in accordance with the relationship:

$$K_T = 2 \, g(A_T/Q)^2 (HW - H_3) - (A_T/A_I)^2 (1 + K_I) \quad (2);$$

where HW is the headwater elevation, $A_I$, is the inlet conduit flow area at the location of the head tap or piezometer, $H_3$ is the piezometric head in the inlet conduit and $K_I$, is an intake loss coefficient representative of losses between a point adjacent to the trash rack (e.g. the location of sensor 62) and the location of the piezometer. The latter coefficient is preferably measured for the particular installation or may be predicted analytically in a manner known by those skilled in the art.

The resulting trash rack loss coefficients provide an indication of head loss across trash rack 44 independent of flow through the trash rack. Trash rack monitoring circuit module 80 preferably determines the trash rack coefficient periodically and communicates the resulting coefficient to circuit 76 for storage in memory circuit 80. By accessing historical trash rack coefficients thus stored in memory circuit 80, circuit 76 may output trending values to operator interface 86, such as for graphically displaying losses due to trash buildup over time. Moreover, trash rack monitoring circuit module 82 preferably generates a reference trash rack loss coefficient when trash rack 44 is clean. Subsequently, by comparing current coefficient values to the reference clean value, controller 48 preferably determines a difference value associated with additional head loss across the trash rack due to fouling.

The difference value is communicated to costing circuit 84, which applies an economic impact factor to the value to determine the economic impact of operation at the current trash rack fouling level rather than with the trash rack clean. The economic impact factor is preferably a unitized energy cost and may be assumed from past performance and stored in memory circuit 80, or may be accessed from an on-line source through communications link 72. For the example of the trash rack loss analysis discussed above, the economic impact value R is preferably generated in accordance with the relationship:

$$R = [(K_T - K_C)(Q/A_T)^2 PE]/[2 \, g(HW - TW)_{avg}] \quad (3);$$

where $K_c$ is an intake loss coefficient for the trash rack when clean (reference value), P is the average annual energy production for the facility, E is an economic energy unit cost, and $(HW-TW)_{avg}$ is the average gross head for the facility. In general, the average annual energy production and average gross head will be known for facility 16. As mentioned above, the economic energy unit cost value may be assumed at an average level for the facility, or may be accessed from an external data source, such as a utility, through communications link 72. In the latter case, economic impact value R will generally reflect the actual cost at the current energy value. Where costs are subsequently accumulated over time, such as by summing or integrating the economic impact value, such accumulated costs will reflect both the changes in operating conditions (e.g., degradation in performance) as well as any changes in energy costs.

By periodically calculating this cost value and storing successive values in memory circuit 80, controller 48 may display trending plots for current and accumulated costs of trash rack fouling on operator interface 86. Controller 48 preferably accumulates similar data for other operating parameters, such as plant efficiency, cavitation and the like as analyzed by other monitoring circuit modules 82 and costing circuit 84. Any or all of these cost estimates may be combined or displayed individually on operator interface 86. As will be appreciated by those skilled in the art, such information may be used by operations, engineering and management personnel as systems diagnostics tools, to improve operation of facility 16, to analyze economic performance, to schedule plant maintenance or for any other suitable purpose. For example, it has been estimated that for a typical 5-unit 175 MW river hydro plant, trash rack losses of one foot represent an annual revenue loss of $500,000.00, assuming an energy value of $25/MWh. Thus, when the cost value for the trash rack losses exceeds a predetermined acceptable level, operations, engineering and management personnel may opt to clean the rack, operate a previously installed automatic cleaning system, or take other remedial measures. Moreover, although the reference levels described above are preferably known optimal or desired operating levels for existing plant equipment, the present technique may be employed using assumed reference levels for improved plant systems. Results of the economic impact analyses described above could then be used as a predictive tool for anticipating potential payback periods, improved performance and the like.

What is claimed is:

1. A method for monitoring performance of a hydroelectric power generation facility, the method comprising the steps of:
    (a) storing in a memory circuit a predetermined reference signal for an operating parameter of the power generation facility, the predetermined reference signal representing a desired operating level for the parameter, the operating parameter being selected from a group comprising differential head from headwater to tailwater, power generation level, cavitation, and trash rack loss;
    (b) sensing a current level of the operating parameter and generating a sensed parameter signal representative thereof;
    (c) comparing the sensed parameter signal to the predetermined reference signal for the parameter to determine a parameter difference signal; and
    (d) applying an economic cost factor to the parameter difference signal to generate an economic cost estimate value, the economic cost estimate value representing the economic cost of operation of the facility at the current level of the operating parameter compared to the desired operating level.

2. The method of claim 1, wherein the predetermined reference signal represents an optimal operating level for the parameter.

3. The method of claim 1, wherein the economic cost factor includes a unitized market value for energy produced by the facility.

4. The method of claim 3, wherein the economic cost factor is accessed from an external data source through a communications link at the facility, the external cost factor tracking the actual value of energy produced by the facility.

5. The method of claim 1, wherein the operating parameter is selected from a group comprising operating efficiently, cavitation and trash rack loss.

6. The method of claim 1, wherein the economic cost factor is an average value for energy produced by the facility over a predetermined historical period.

7. The method of claim 1, comprising the further steps of storing the economic cost estimate value in a memory circuit, repeating steps (b)–(d) a plurality of times over a predetermined period to generate subsequent economic cost estimate values, storing the subsequent economic cost estimate values in the memory circuit, and generating a total cost value from the estimate values, the total cost value representing the economic cost of operating the facility at levels of the operating other than the desired operating level over the predetermined period.

8. The method of claim 1, wherein the operating parameter is at least two operating parameters, the at least two operating parameters including flow through the facility and the operating parameter being selected from the group comprising differential head from headwater to tailwater, power generation level, cavitation, and trash rack loss.

9. A method for determining economic impact of operation of a hydroelectric power generation facility at conditions other than predetermined reference conditions comprising the steps of:

(a) storing in a memory circuit a reference value for an operating parameter of the facility, the reference value representing a reference operating level for the parameter, the operating parameter being selected from a group comprising differential head from headwater to tailwater, power generation level, cavitation, and trash rack loss;

(b) monitoring operation of the facility and generating an actual value for the operating parameter;

(c) comparing the reference value to the actual value to determine a difference value;

(d) deriving an economic impact value from the difference value by applying an economic impact factor thereto; and (e) storing the economic impact value in the memory circuit.

10. The method of claim 9, wherein the reference value represents an optimal or desired level of the operating parameter.

11. The method of claim 9, wherein the economic impact value represents a net cost of operating the facility at the actual value of the parameter.

12. The method of claim 9, wherein the economic impact value includes a unitized cost factor for energy produced by the facility.

13. The method of claim 9, comprising the further steps of repeating steps (b)–(e) a plurality of times over a predetermined period, storing subsequent economic impact values in the memory circuit, and generating a total economic impact value from the economic impact values, the total impact value representing the economic impact of operating the facility at levels of the operating other than the reference level.

14. The method of claim 9, wherein the operating parameter is at least two operating parameters, the at least two operating parameters including flow through the facility and the operating parameter being selected from the group comprising differential head from headwater to tailwater, power generation level, cavitation, and trash rack loss.

15. A system for determining economic impact of operation of a hydroelectric power generation facility at an operating level other than a predetermined reference operating level for an operating parameter, the facility including a dam extending across a stream and at least one turbine generator supported within the dam for generating electrical power from water flow from an upstream side to a downstream side of the dam, the system comprising:

a memory circuit, the memory circuit storing a reference parameter value representative of the reference operating level for the operating parameter, the operating parameter being selected from a group comprising differential head from the upstream side to the downstream side of the dam, power generation level, cavitation, and trash rack loss;

a sensor, the sensor being situated in the facility to detect actual levels of the operating parameter and to generate an actual parameter value representative thereof; and a controller coupled to the memory circuit and to the sensor, the controller comparing the reference parameter value and the actual parameter value and applying an economic impact factor thereto to generate an economic impact value representative of the economic impact of operation of the facility at the actual level of the parameter rather than the reference level.

16. The system of claim 15, wherein the controller includes a programmed computer.

17. The system of claim 15, wherein the economic impact factor is representative of the value of energy produced by the facility.

18. The system of claim 15, further comprising a plurality of sensors for detecting actual levels of a plurality of operating parameters, wherein the memory circuit stores reference parameter values for each of the plurality of operating parameters, and wherein the controller is coupled to the plurality of sensors, compares each of the actual levels to reference levels for respective parameters to determine respective difference values, and applies economic impact factors to each of the difference values to generate economic impact values for each of the plurality of operating parameters.

19. The system of claim 15, wherein the sensor includes at least two separate sensing devices, the controller being coupled to the sensing devices and deriving the actual parameter value from signals generated by the sensing devices.

20. The system of claim 15, further comprising an operator interface coupled to the controller, the controller displaying on the operator interface indicia representative of the economic impact value.

* * * * *